Figure 1:
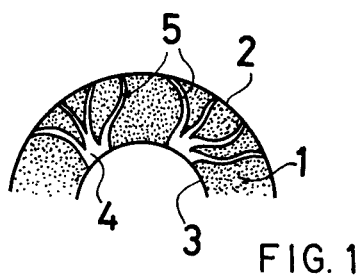

United States Patent [19]

Kobayashi et al.

[11] 4,025,689

[45] May 24, 1977

[54] METHOD FOR MANUFACTURE OF GRAPHITIZED HOLLOW SPHERES AND HOLLOW SPHERES MANUFACTURED THEREBY

[75] Inventors: Kazuo Kobayashi; Shiroh Ohmori; Tetsuhiko Hasuda; Minoru Shiraishi; Satoshi Arai, all of Kawaguchi, Japan

[73] Assignee: Agency of Industrial Science & Technology, Tokyo, Japan

[22] Filed: Aug. 5, 1974

[21] Appl. No.: 494,757

Related U.S. Application Data

[63] Continuation-in-part of Ser. No. 285,508, Aug. 31, 1972, abandoned.

[30] Foreign Application Priority Data

Sept. 1, 1971 Japan .............................. 46-67095

[52] U.S. Cl. .................... 428/402; 210/40; 210/DIG. 26; 252/421; 252/445; 264/29.1; 264/44; 423/445

[51] Int. Cl.² .......................................... C01B 31/04

[58] Field of Search .............. 264/43, 44, 29; 423/445; 425/402; 252/421, 445

[56] References Cited

UNITED STATES PATENTS

| | | | |
|---|---|---|---|
| 2,127,867 | 8/1938 | Harvey | 264/44 |
| 2,553,759 | 5/1951 | Geiger | 264/44 X |
| 2,627,642 | 2/1953 | Osborne | 264/43 UX |
| 2,676,892 | 4/1954 | McLaughlin | 264/43 UX |
| 2,987,411 | 6/1961 | Minnick | 264/44 X |
| 3,010,177 | 11/1961 | Thompson et al. | 264/43 UX |
| 3,247,294 | 4/1966 | Sabouni | 264/44 X |
| 3,258,349 | 6/1966 | Scott | 264/44 X |
| 3,467,165 | 9/1969 | Angeloff | 264/44 X |
| 3,470,276 | 9/1969 | Ohno | 264/44 |
| 3,533,961 | 10/1970 | Voet et al. | 252/421 |
| 3,591,393 | 7/1971 | Rankine | 264/44 X |
| 3,663,171 | 5/1972 | Granger | 252/421 |
| 3,891,574 | 6/1975 | Kobayashi et al. | 252/421 |
| 3,917,806 | 11/1975 | Amagi et al. | 252/421 X |
| 3,953,345 | 4/1976 | Saito et al. | 252/421 X |

Primary Examiner—Philip Anderson
Attorney, Agent, or Firm—Kurt Kelman

[57] ABSTRACT

Disclosed are graphitized hollow spheres and a method for the manufacture thereof which comprises coating a spherical core of foamed polystyrene with carbonaceous powder and a binder, heating the coated core under controlled conditions to decompose the spherical core of foamed polystyrene, and further heating the resultant carbonaceous body at a high temperature.

4 Claims, 2 Drawing Figures

METHOD FOR MANUFACTURE OF GRAPHITIZED HOLLOW SPHERES AND HOLLOW SPHERES MANUFACTURED THEREBY

CROSS-REFERENCE TO RELATED APPLICATION

The present application is a continuation-in-part application of U.S. Ser. No. 285,508, filed Aug. 31, 1972, now abandoned.

This invention relates to a method for the manufacture of graphitized hollow spheres and to the hollow spheres manufactured by the method. More particularly, this invention relates to a method for manufacturing light-weight graphitized hollow spheres by the steps of coating the surface of spherical cores of foamed polystyrene with a carbonaceous powder so as to give rise to composite spheres, heating the composite spheres at a temperature higher than the decomposition temperature of the foamed polystyrene thereby decomposing the foamed polystyrene and consequently producing light-weight hollow spheres and thereafter heating the light-weight hollow spheres at a still higher temperature so as to graphitize the shells constituting the hollow spheres.

Heretofore known carbonaceous hollow spheres are those of carbon obtained by mixing pitch with a foaming agent and foaming the mixture under application of heat. These hollow spheres have extremely small dimensions and are formed of limited kinds of substances which are composed of specific elements. Further, methods used for their manufacture are complicated.

U.S. Pat. No. 2,685,507 teaches a process involving a technique similar to that of the present invention. The similarity resides in the particular aspect of technique which comprises enveloping a substance of a lower melting point with a substance of a higher melting point, heating the resultant composite to melt or decompose the substance having the lower melting point and evacuating the molten or decomposed substance from the composite for consequently giving rise to a hollow body. In U.S. Pat. No. 2,685,507, the substance of the lower melting point is a helical metal, the substance of the higher melting point is a powdered metal particle and the process involved comprises placing the powdered metal particle and the helical metal in a pair of matched dies, compressing them by closing the dies and heating them for thereby melting the helical metal and infiltrating the powdered metal particle with the molten metal. Thus, the product of this process is a cylindrical metal body containing a helical core and which serves as a bearing having a lubricating agent stored in the helical core.

A primary object of this invention is to provide a method for the manufacture of graphitized light-weight hollow bodies having excellent physical properties.

Another object of this invention is to provide grapitized light-weight hollow bodies the shells of which contain a multiplicity of fine through pores having a specific profile.

Figure 2:
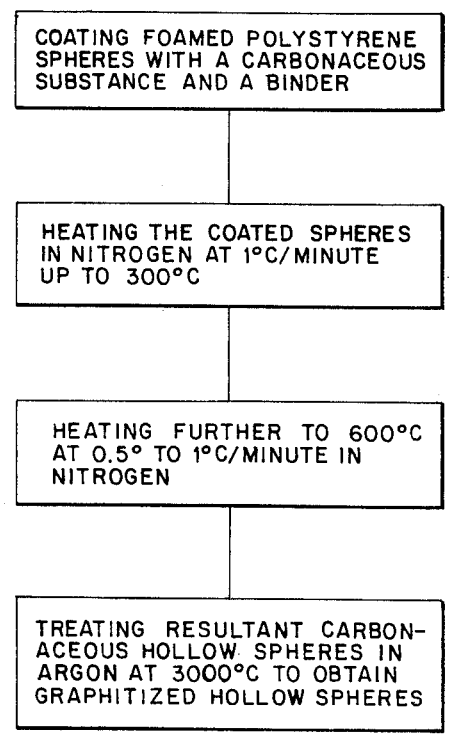

In the drawing,

FIG. 1 is a model diagram illustrating the profile of one of the multiplicity of fine through pores formed in the shells of the graphitized light-weight bodies, the pores serving to establish communication between the inside and the outside of the hollow bodies, and FIG. 2 is a flow chart showing the method of manufacture.

According to the present invention, there is provided a method comprising the steps of coating spherical cores of foamed polystyrene with a carbonaceous substance having a higher melting point than that of the foamed polystyrene cores, and thereafter heating the resultant composites at a temperature higher than the melting point of the foamed polystyrene cores, namely first to a temperature of up to 300° C, whereby the spherical foamed polystyrene cores first become molten and then are thermally decomposed into a gaseous form and the gas thus formed escapes from the inside through the coating, emptying the interior spaces formerly occupied by the foamed polystyrene cores and leaving a multiplicity of fine through pores in the coatings now hardened into shells. The spherical shells can be obtained in desired dimensions by suitably fixing the diameter of individual spherical cores of foamed polystyrene and the thickness of a coat to be formed on the cores. The spherical shells are then heated at a still higher temperature so as to be graphitized and to give rise to light-weight hollow graphite spheres.

Examples of the carbonaceous substance include petroleum coke, pitch coke, graphite, coal, charcoal and carbon black.

The substance to be used for coating is first prepared in a powdered form and then deposited uniformly on the surface of the spherical cores of foamed polystyrene. Since there is a possiblity that the coating substance may produce cracks or undergo disintegration, it is necessary that the substance be used in conjunction with a binder to preclude such a possibility. The binder is mixed in advance with the coating powder and the resultant powdered mixture is wetted or converted into a slurry, so that the cores will be coated with the wet powder or slurry. Alternatively, the binder may be sprayed onto the coating substance which has already been deposited on the surface of the cores. It is also permissible to effect the coating by suspending the powdered coating substance in a suitable medium and then submerging the cores in the resulting suspension.

Examples of the substances usable advantageously as a binder are water, starch paste, pitch, tar, spent pulp liquid, aqueous bentonite solution, carboxymethyl cellulose, water glass, etc.

The method for blending the binder and the coating substance may be suitably selected by taking into account the particular kind of the binder and that of the coating substance to be actually used.

One typical way of coating is by use of a plate type pelletizer, for example.

To be specific, the desired coating can be accomplished by first charging the pelletizer with spherical foamed polystyrene as a core material in conjunction with a powdered coating substance, then fixing the pelletizer in its working conditions and finally putting it into operation. When necessary, incorporation of the binder may be accomplished by suitably spraying it. It is generally sufficient to use only one kind of coating substance. Where hollow spheres of special outstanding properties are desired, they can be obtained by using a mixture of two or more coating substances each possessed of a particular set of propeties.

The diameter of the spherical cores of foamed polystyrene and the thickness of the coating substance deposited on the cores may be suitably chosen so as to meet the purpose for which the produced hollow spheres are used.

The composite spheres are first dried and then heated as occasion demands. The temperature at which this heating is carried out is required to fall within the range in which the foamed polystyrene as the core material is molten and vaporized and the spherical shells formed of the coating substance retain their shape without being deformed or disintegrated. When the composite spheres are heated, therefore, it is necessary that the rate of temperature increase be properly controlled lest the generation of gas due to vaporization of the cores should occur abruptly and cause a sharp increase in the inner pressure. When the temperature of the composite spheres rises in consequence of the heating, the cores made of foamed polystyrene begin to shrink at about 100° C to produce a small void in each shell of coating substance. As the temperature reaches 200° C, they become molten and are subsequently decomposed and vaporized. The resulting gas is dispersed within the shells and subsequently discharged out of the shells. The gas generated in consequence of the vaporization of foamed polystyrene behaves in a complicated manner while passing through the shells of the coating substance. Since the gas is gradually dispersed in and discharged out of the shells, a multiplicity of fine through pores are formed in the shells along the paths through which the gas has escaped from the inside to the outside of the shells. Each pore which opens on the inside wall surface with a relatively larger diameter is ramified at a certain depth of the shell into many finer pores, which extend to reach the outer wall surface. We have confirmed this pattern of pore distribution with the aid of scanning type electron photomicrographs. FIG. 1 illustrates in a model diagram the condition of such through pores confirmed by means of photomicrographs. In the drawing, 1 denotes the coating substance, 2 the outer surface of the shell formed of the coating substance, 3 the inner surface of the shell, 4 the pore of a larger diameter on the inner surface side and 5 the finer ramified pores. Formation of pores of such structure constitutes in itself one of the characteristics of the present invention.

The heating described above results in the formation of light-weight hollow spheres. These light-weight hollow spheres are then heated to a still higher temperature, so that the shells of coating substance are graphitized thereby producing light-weight hollow graphite spheres.

The aforementioned fine pores formed within the shells of such coating substance are retained intact through the heating treatment to obtain graphitized light-weight hollow spheres having the same shell structure as illustrated in FIG. 1. The description made up to this point has been limited to the use of a single layer of a coating substance. If the coating is formed in two or more layers, then the resultant hollow spheres can assume the properties of a composite product. To prevent the coating substance from oxidizing, the heating is carried out within an inert atmosphere of argon or nitrogen or within an atmosphere of hydrogen reducing gas.

The present invention will be described in further detail herein below with reference to a preferred embodiment.

A disc type pelletizer was charged with spherical cores of foamed polystyrene about 7mm in diameter simultaneously with a mixture consisting of a powdered petroleum coke and pitch and starch added thereto as a binder, and then the pelletizer was put into operation. Consequently there were obtained spheres about 10mm in diameter. These spheres were placed in an external heating type rotary kiln and then heated in an atmosphere of nitrogen at a rate of temperature increase of 1° C/min to 300° C, at a rate of 0.5° C/min from 300° to 450° C and at a rate of 1° C/min from 450° to 600° C. Consequently, there were obtained carbonaceous hollow spheres about 0.7 in bulk density, about 5.0kg in compressive strength of individual sphere, about 10mm in outside diameter and about 7mm in inside diameter and having shells of a structure like the one illustrated. When these carbonaceous hollow spheres were further treated at 3000° C in the presence of argon gas, they were converted into graphitized hollow spheres.

As is clear from the foregoing explanation, the method for the manufacture of hollow spheres according to this invention is characterized in that the sintered hollow spheres obtained by using, as the coating substance, a carbonaceous substance such as petroleum coke, pitch coke, coal, charcoal or carbon black have numerous fine through pores formed in shells thereof to establish communication between the inside and the outside of individual spheres. They are further characterized in that they are light because of the voids, have high mechanical strength, have excellent resistance to heat, acids and alkalis and exhibit outstanding physical and chemical properties. Because of these characteristics, they are used advantageously as a filler for refractory materials in ultrahigh temperature furnaces, as a filler for construction materials and as a material for members in various chemical facilities and they also find utility as an oil sequestrant. Depending on the manner of heat treatment, hollow spheres obtained by using a carbonaceous substance as the coating substance exhibit outstanding properties as an activated carbon.

Unlike the conventional method, the method according to the present invention produces hollow spheres without using a foaming agent. It also enables the hollow spheres to be formed in a desired inside diameter so far as the size of foamed polystyrene cores is suitably selected. The outside diameter of these spheres can be controlled by selecting the thickness of the coating to be formed on the cores. The hollow spheres manufactured by the method of this invention have a special structure and enjoy outstanding physical properties and chemical properties and are suited to the various uses described above.

The following preferred embodiments are illustrative of the present invention and are not to be construed as limitative in any way.

EXAMPLE 1

Foamed polystyrene spheres about 8mm in diameter were used as cores. Powdered petroleum coke and powdered pitch were mixed at an approximate ratio of 7:3. This mixture was intimately blended with carbohydrate paste added thereto as the binder. The cores were coated with the coating material thus prepared to form bistratal spheres about 10mm in diameter. When these spheres were heated from normal room temperature to about 300° C in the atmosphere of nitrogen, the foamed polystyrene cores within were melted and decomposed to give rise to hollow spheres. The hollow spheres were subsequently heated up to 900° C at the rate of 3° C/min similarly within the atmosphere of nitrogen so as to undergo calcination. Consequently, there were obtained light-weight hollow spheres of a carbonic texture about 8mm in inside diameter and 9 to 11mm in outside diameter. The hollow spheres thus obtained were found to have a bulk density of 0.3 to 0.6 and a compressive strength of about 5.0kg. Light-weight hollow spheres of a graphitic texture were produced when the spheres were heated to about 3000° C in the atmosphere of argon inside a Tammann furnace so as to undergo calcination.

EXAMPLE 2

Foamed polystyrene spheres each about 5mm in diameter were used as cores. A mixture consisting of powdered petroleum coke and powdered pitch at an approximate rate of 7:3 was intimately blended with carbohydrate paste selected as the binder. The cores were coated with the coating material thus prepared. The molded spheres were treated to form bistratal spheres 8mm in diameter. These spheres were subsequently heated slowly from normal room temperature to 900° C in the atmosphere of nitrogen so as to undergo calcination. Consequently, there were obtained light-weight hollow spheres of a carbonic texture, which were found to have a bulk density of 0.7 and a compressive strength of 3.5kg.

EXAMPLE 3

Spherical cores of materials indicated in Table 1 were coated with various coating materials each incorporating a binder with the aid of a desk type pelletizer to produce bistratal spheres. In a rotary kiln, the molded spheres thus obtained were subjected to heat treatment in the atmosphere of nitrogen, with the temperature raised at the rate of 1° C/min up to 300° C, 0.5° C/min up to 450° C and 1° C/min up to 600° C respectively. The hollow spheres thus produced were found to have properties as shown in Table 1. In the table, the term "water absorbed" means the ratio of weight increase against the dead weight as determined after the hollow spheres had stood 24 hours in water.

Table 1

| | Starting materials | | | | Physical Properties of products | | |
|---|---|---|---|---|---|---|---|
| Core Material | Diameter of core (mm) | Coating material | Thickness of coating material (mm) | Binder | Bulk density | Compressive strength (kg) | Water absorbed (wt %) |
| Foamed polystyrene sphere | 0.7 | Coal | 0.3 | Spent sulfur pulp liquor | 0.5 | 3.0 | 30 |
| " | 3 | " | 1 | " | 0.3 | 4.5 | 30 |
| " | 8 | " | 2 | " | 0.4 | 4.0 | 32 |
| " | 7 | Petroleum coke | 3 | Pitch and paste | 0.7 | 5.0 | 21 |
| " | 7 | Natural graphite | 3 | " | 0.7 | — | 32 |

EXAMPLE 4

Foamed polystyrene spheres about 8mm in diameter were used as cores. Powdered shale blended with water was used as a coating material. The cores were coated with the coating material in a pan type pelletizer to form bistratal spheres about 10mm in diameter. The molded spheres were dried at about 100° C until the shells were thoroughly solidified, and thereafter they were subjected to a heat treatment in an electric muffle furnace using silicon carbide as the heat source. In this heat treatment and the furnace interior was raised to and kept at 300° C, the molded spheres were held in the furnace for about 30 minutes at that temperature to cause melting and decomposition of the internal foamed styrol cores, with the result that hollow spheres were formed. Subsequently, the hollow spheres were placed in the furnace now kept at 1200° C and calcined for about 30 minutes. Hollow spheres obtained in consequence of this calcination measured about 8mm in inside diameter and 9 to 11mm in outside diameter. They were found to have a bulk density of about 0.5 and a moisture adsorption of less than 1%. In these hollow spheres, the shells were also foamed to some extent. Thus, they had a far smaller apparent bulk density than ordinary foamed light-weight aggregates.

Cores of the same material but having varying diameters were coated with a coating material of the same substance which was spread to varying thicknesses as indicated below. The molded spheres were treated under the same conditions as mentioned above. The results are shown in Table 2 below.

Table 2

| Diameter of core (mm) | Thickness of coating material (mm) | Bulk density | Water absorption ratio (wt %) |
|---|---|---|---|
| 8 | 0.5 | 0.34 | 4.5 |
| 9 | 1 | 0.51 | 4.9 |
| 4 | 0.5 | 0.49 | 4.2 |

As is clear from the preceding table, the bulk density of hollow spheres could be freely selected. The hollow spheres thus obtained proved to serve as the most suitable filler for fireproof building materials.

We claim:
1. Light-weight hollow bodies consisting of shells each defining an empty interior space, the shells consisting of a graphitized carbonaceous substance defining a multiplicity of pores, each of the pores having a relatively large diameter opening facing the empty interior space and being ramified from the opening into a multiplicity of fine pores having smaller diameters than the diameter of the opening, the fine pores opening on the shell surface.

2. A method for the manufacture of graphitized hollow bodies each defining an empty interior space, which comprises
   1. coating spherical cores of foamed polystyrene with a layer of a mixture of at least one carbonaceous substance selected from the group consisting of petroleum coke, pitch coke and carbon black with a binder to form coated spheres having a diameter of 0.5 to 20 mm,
   2. heating the coated spheres in an inert gas first to a temperature of 300° C at a rate increasing by 1°

C/minute until each spherical core of foamed polystyrene is melted and decomposed to generate gas and to cause the generated gas to penetrate through the layer and disperse into the ambient atmosphere while the layer forms a shell constituting a hollow body of the carbonaceous substance defining the empty interior space, a. the gas penetrating through the shell producing a multiplicity of fine through pores, each of the pores having a relatively large diameter opening facing the empty interior space and being ramified from the opening into a multiplicity of fine pores having smaller diameters than the diameter of the opening, the fine pores opening on the outer shell surface, 3. then heating the hollow bodies in nitrogen gas to a temperature of 6000° C at a rate increasing from 300° to 600° C by 0.5° to 1° C/minute, and 4. thereafter heating the hollow bodies in argon gas to a temperature of 3000° C.

3. The method of claim 2, wherein the hollow bodies are heated from 300° to 450° C at a rate increasing by 0.5° C/minute and from 450° to 600° C at a rate increasing by 1° C/minute.

4. The method of claim 2, wherein the binder is composed of at least one member selected from the group consisting of water, starch paste, pitch, tar, spent pulp liquid, aqueous bentonite solution, carboxymethyl cellulose and water glass.

* * * * *